(12) United States Patent
Snow et al.

(10) Patent No.: US 10,815,574 B2
(45) Date of Patent: Oct. 27, 2020

(54) COATED ARTICLE AND RELATED METHODS

(71) Applicant: ND Industries, Inc., Clawson, MI (US)

(72) Inventors: Gerald F. Snow, Almont, MI (US); Christopher T. Hable, Romeo, MI (US); Scot Wickham, Clawson, MI (US)

(*) Notice: Subject to any disclaimer, the term of this patent is extended or adjusted under 35 U.S.C. 154(b) by 135 days.

(21) Appl. No.: 15/862,867

(22) Filed: Jan. 5, 2018

(65) Prior Publication Data

US 2018/0195180 A1 Jul. 12, 2018

Related U.S. Application Data

(60) Provisional application No. 62/443,195, filed on Jan. 6, 2017.

(51) Int. Cl.
| | | |
|---|---|---|
| C23F 11/173 | (2006.01) | |
| C09D 177/02 | (2006.01) | |
| C09D 7/63 | (2018.01) | |
| C09D 5/08 | (2006.01) | |
| C09D 7/40 | (2018.01) | |
| C09D 5/03 | (2006.01) | |
| C09D 177/06 | (2006.01) | |
| C09D 163/00 | (2006.01) | |
| B05D 1/12 | (2006.01) | |
| B05D 3/02 | (2006.01) | |
| C08K 7/24 | (2006.01) | |

(52) U.S. Cl.
CPC ............ *C23F 11/173* (2013.01); *C09D 5/033* (2013.01); *C09D 5/08* (2013.01); *C09D 7/63* (2018.01); *C09D 7/70* (2018.01); *C09D 163/00* (2013.01); *C09D 177/02* (2013.01); *C09D 177/06* (2013.01); *B05D 1/12* (2013.01); *B05D 3/0218* (2013.01); *B05D 2202/00* (2013.01); *B05D 2601/20* (2013.01); *C08K 7/24* (2013.01)

(58) Field of Classification Search
CPC .................................................. C23F 11/173
See application file for complete search history.

(56) References Cited

U.S. PATENT DOCUMENTS

| | | | | |
|---|---|---|---|---|
| 4,407,914 A | * | 10/1983 | Inoue ...................... | H01M 2/08 429/174 |
| 5,304,023 A | * | 4/1994 | Toback ................. | F16B 33/004 411/387.3 |
| 5,336,304 A | * | 8/1994 | Andoe ................. | C09D 5/1662 106/15.05 |
| 5,426,130 A | | 6/1995 | Thurber et al. | |
| 5,441,373 A | * | 8/1995 | Kish ................... | F16B 15/0092 411/258 |
| 5,571,312 A | * | 11/1996 | Andoe ................. | C08G 59/226 106/18.32 |
| 5,651,824 A | | 7/1997 | Wallace et al. | |
| 5,656,325 A | | 8/1997 | Wallace | |
| 5,672,376 A | | 9/1997 | Wallace | |
| 5,679,160 A | | 10/1997 | Wallace et al. | |
| 5,928,711 A | | 7/1999 | Wallace et al. | |
| 5,964,551 A | | 10/1999 | Wallace | |
| 6,027,568 A | | 2/2000 | Wallace et al. | |
| 6,270,838 B1 | | 8/2001 | Wallace et al. | |
| 6,322,628 B1 | | 11/2001 | Wallace | |
| 6,474,919 B2 | | 11/2002 | Wallace et al. | |
| 6,817,816 B2 | | 11/2004 | Hill | |
| 7,404,483 B2 | | 7/2008 | Wallace | |
| 7,521,402 B2 | | 4/2009 | Combetta | |
| 7,771,148 B2 | | 8/2010 | Phillips | |
| 7,772,316 B2 | | 8/2010 | Barr | |
| 7,878,744 B2 | | 2/2011 | Snow et al. | |
| 8,865,794 B2 | | 10/2014 | Wallace et al. | |
| 8,865,812 B2 | | 10/2014 | Phillips | |
| 2003/0092789 A1 | * | 5/2003 | Jin ....................... | C08K 3/22 522/81 |
| 2007/0225444 A1 | * | 9/2007 | Barr ..................... | C08L 77/00 525/178 |
| 2014/0199135 A1 | | 7/2014 | Hable et al. | |
| 2015/0014126 A1 | | 1/2015 | Snow | |
| 2015/0056394 A1 | | 2/2015 | Rawls | |
| 2016/0222222 A1 | | 8/2016 | Stupar et al. | |

FOREIGN PATENT DOCUMENTS

| | | |
|---|---|---|
| CA | 2632482 A1 | 11/2008 |
| WO | WO9966219 A1 | 12/1999 |
| WO | WO2008073262 A1 | 6/2008 |
| WO | WO2008094535 A1 | 8/2008 |
| WO | WO2008094537 A2 | 8/2008 |
| WO | WO2008153866 A1 | 12/2008 |
| WO | WO2008153868 A1 | 12/2008 |

\* cited by examiner

*Primary Examiner* — Megan McCulley
(74) *Attorney, Agent, or Firm* — Warner Norcross + Judd LLP

(57) ABSTRACT

A coated article comprises an article comprising a surface and a galvanic barrier coating disposed on the surface. The galvanic barrier coating is formed from a galvanic barrier coating composition comprising (a) a thermoplastic resin, (b) an epoxy-based resin, (c) a curing agent, and (d) non-compressible, non-marring microsphere particles. Methods of preparing and using the coated article are also disclosed.

17 Claims, No Drawings

COATED ARTICLE AND RELATED METHODS

CROSS-REFERENCE TO RELATED APPLICATIONS

This application claims priority to and all advantages of U.S. Patent Application No. 62/443,195 filed on Jan. 6, 2017, the content of which is hereby incorporated by reference.

FIELD OF THE INVENTION

The disclosure relates to a coated article and, more specifically, to a coated article including a galvanic barrier coating and to a method of preparing and using the coated article.

DESCRIPTION OF THE RELATED ART

Galvanic corrosion can occur when dissimilar metals are joined in the presence of an electrolyte, such as water. Galvanic corrosion can be particularly challenging when using articles (e.g. fasteners) made from one type of metal material to join a part made from a different type of metal material. For example, when steel fasteners are used to join an aluminum part, the aluminum can become a sacrificial component and corrode. Corrosion of the aluminum part adjacent the steel fastener can weaken the joint between the steel fastener and the aluminum part, potentially leading to failure of the joint over time. Moist, high temperature environments, such as those experienced in military, aircraft, and automobile applications can promote galvanic corrosion.

Galvanic barrier coatings have previously been applied to articles to inhibit galvanic corrosion. A desirable galvanic barrier coating is configured to withstand high temperature environments and be easy to apply to articles, particularly articles having multiple contours. In addition to preventing corrosion, it is also desirable that a galvanic barrier coating offer protection from damage to both the article that the coating is applied to as well as any adjacent part(s).

SUMMARY OF THE INVENTION

The present invention provides a coated article. The coated article includes an article comprising a surface, and a galvanic barrier coating disposed on the surface of the article. The galvanic barrier coating is formed from a galvanic barrier coating composition comprising (a) from about 60 to about 80 percent by weight of a thermoplastic resin; (b) from about 15 to about 25 percent by weight of an epoxy-based resin; (c) from about 2.0 to about 3.0 percent by weight of a curing agent suitable for cross-linking the epoxy-based resin; and (d) from about 4 to about 10 percent by weight of non-compressible, non-marring microsphere particles, each based on the total weight of the galvanic barrier coating composition.

The present invention also provides a method of preparing the coated article. The method comprises disposing the galvanic barrier coating composition on at least a portion of the surface of the article. The method further comprises forming the galvanic barrier coating from the galvanic barrier coating composition to give the coated article.

The present invention further provides a method of adjoining adjacent elements with the coated article. The method comprises disposing the coated article adjacent and/or through the adjacent elements.

DETAILED DESCRIPTION

The present invention provides a coated article, a method of preparing the coated article (i.e., "method of manufacture"), and a method of adjoining adjacent elements with the coated article (i.e., "method of use"). The coated article is described immediately below, followed by a description of the method of manufacturing the coated article and the method of using the coated article. That being said, it is to be appreciated that the coated article of the present embodiments is not limited to a particular method of manufacture or use.

The coated article includes an article comprising a surface. The article is not limited and may be any article comprising a surface and suitable for coating with a galvanic barrier coating, such as the galvanic barrier coating described herein. Accordingly, the article may be of any configuration, size, dimension, shape, or combination of shapes. Likewise, the article may comprise any particular portion, such as a head, shank, shoulder, body, and the like, or combinations thereof. Furthermore, the article may be formed from any conventional material(s), such as metal, wood, plastic, ceramic, glass, and the like, or combinations thereof. Typically, the article comprises metal. The metal may be any metal suitable for use in an article, and is typically selected to provide the article with strength, rigidity, and/or durability. Specific examples of suitable metals include iron, brass, bronze, titanium, aluminum, magnesium, tungsten, molybdenum, manganese, chromium, nickel, and the like, or a combination or alloy thereof. In some embodiments, the metal is an alloy. Examples of suitable alloys include steels, such as carbon steels, alloy steels, stainless steels, and the like, and combinations thereof.

The article may further include a conventional plating and/or coating, such as those coatings selected to prevent corrosion and/or aid in installation of the article. Specific examples of suitable conventional plating/coatings include zinc plating (e.g. galvanization), chromium (or chrome) plating, nickel plating, cadmium plating, aluminum plating, phosphate (e.g. dry phosphate) coating, and combination thereof. In certain embodiments, the article is formed from one type of metal and further comprises a conventional plating and/or coating comprising another type of metal. Alternatively, the article may be a "virgin" or "bright" article (i.e., it may lack plating/coating).

The surface of the article may be external (i.e., male) or internal (i.e., female), and is typically located on an exterior of the article. The surface may be of any type, configuration, or pattern. As such, any portion of the surface may be flat, contoured, smooth, rough, threaded, and/or the like, depending on the configuration of the article. However, the surface of the article is not limited to, for example, a threaded surface, nor to any particular major diameter, minor diameter, pitch diameter, helix angle, thread angle, thread count, thread pitch, or number of crests/roots. It is to be appreciated that the surface of the article may comprise the conventional plating and/or coating, if any, or may be free from, alternatively substantially free from, the conventional plating and/or coating.

In some embodiments, the article is a fastener. The fastener is not limited and may be selected from any conventional fasteners understood in the art. Examples of suitable fasteners include standard fasteners characterized by any of the ASTM, SAE, and/or ISO grades/classes of fasteners. The fastener may include a fastener head and/or shank. Likewise, the surface of the fastener may be threaded, or may include a threaded portion. Suitable fasteners include, but are not limited to, bolts, nuts, screws, studs, stand-offs, rivets, rivnuts, and combinations thereof. With bolts, screws, studs, and stand-offs, the fastener will generally have an elongated body, which may optionally include a threaded surface, and also optionally, an adjacent non-threaded surface (or surfaces) and/or the fastener head. The fastener may be of various types, drive types, head styles, diameters, and lengths. Likewise, the fastener may comprise any particular major diameter, minor diameter, pitch diameter, helix angle, thread angle, thread count, thread pitch, and/or number of crests/roots. Combinations of different fasteners may be utilized as well, as will be appreciated from the description herein. Suitable fasteners for preparing the coated fasteners of the present invention are commercially available from a large number of suppliers. However, the article may be something other than a fastener, such as a stamping.

The coated article further comprises a galvanic barrier coating disposed on the surface of the article. It is to be appreciated that the term "coating," is not to be construed as limiting the coated article in any way, such as by limiting the coated article to a particular configuration or method of manufacture. Furthermore, the galvanic barrier coating may be disposed on any portion(s) of the surface of the article, as will be understood by those of skill in the art. For example, the galvanic barrier coating may be disposed on only a portion of the surface of the article. As such, the term "coated" extends to coating or enveloping the entire article or the entire surface of the article with the galvanic barrier coating, but does not require such extensive coating/enveloping.

Typically, the galvanic barrier coating is disposed about the surface of the article to coat the surface thereof, although partial coating may be carried out, e.g. circumferentially and/or lengthwise. As such, the galvanic barrier coating may be disposed on a portion, a minority, a majority, or an entirety, of the surface of the article. Likewise, coated article may comprise the galvanic barrier coating disposed on any combination of threaded and/or non-threaded portions of the article, such as on an adjacent smooth or non-threaded surface(s) or the head of the article. In some embodiments, the surface of the article comprises the conventional plating and/or coating, and the galvanic barrier coating is disposed on or adjacent the conventional plating and/or coating.

The coated article may comprise the galvanic barrier coating in any amount. As such, the average thickness of the galvanic barrier coating on the coated article may be uniform or may vary.

The galvanic barrier coating comprises the reaction (e.g. cure) product of a galvanic barrier coating composition, as described below. As such, it is to be appreciated that the term "galvanic barrier coating" is generally used herein to describe the galvanic barrier coating composition in a final cure state (i.e., mostly or fully cured/crosslinked), but may refer to the galvanic barrier coating composition any time after cure is initiated. Likewise, the term "galvanic barrier coating composition" is generally used herein to describe the galvanic barrier coating composition while in an uncured state (i.e., at least partially uncured/uncrosslinked), such as prior to initiating cure (i.e., before reaction/cure of the components of the galvanic barrier coating composition). Accordingly, it is also to be appreciated that any amounts recited herein relative to the components of the galvanic barrier coating composition are typically on an unreacted basis unless otherwise indicated.

The galvanic barrier coating composition includes (a) a thermoplastic resin, (b) an epoxy-based resin, (c) a curing agent suitable for cross-linking the epoxy-based resin, and (d) non-compressible, non-marring microsphere particles.

The (a) thermoplastic resin provides the galvanic barrier coating composition with adhesive properties sufficient to adhere the galvanic barrier coating composition and/or the galvanic barrier coating formed therefrom to the article. The (a) thermoplastic resin is not limited, and may by any thermoplastic or combinations of thermoplastics known in the art. Examples of suitable thermoplastics include polyamide resins, polyester resins, thermoplastic urethanes, polyolefins (e.g. polypropylenes, polyethylenes, etc.) and combinations, modifications, and interpolymers thereof. The (a) thermoplastic resin may also comprise additives and/or other components, such as those known in the art to promote, increase, prevent, or decrease curing time, shelf-life, stability, and/or adhesion in thermoplastic resins. One specific example of such additives is an adhesion promotor, which may be any type of adhesion promotor known in the art (e.g. an epoxy adhesion promotor). In some embodiments, the (a) thermoplastic resin comprises a polyamide resin. Specific non-limiting examples of suitable polyamide resins include Nylon 6, Nylon 6/10, Nylon 12/12, Nylon 11, Nylon 12, Nylon 6/6, and Nylon 6/12. In particular embodiments, the (a) thermoplastic resin comprises a polyamide resin and an epoxy adhesion promotor.

The (a) thermoplastic resin is present in the coating composition in an amount of from about 60 to about 80, alternatively from about 70 to about 80, alternatively from about 72 to about 78, alternatively from about 74 to about 76, alternatively in an amount of about 75, wt.% based on the total weight of the galvanic barrier coating composition (i.e., percent by weight).

Typically, the (a) thermoplastic resin has a melting and/or softening point which is less than a curing temperature of the (b) epoxy-based resin, such that the (a) thermoplastic resin is soft and/or pliable during curing of the (b) epoxy-based resin. In certain embodiments, the (a) thermoplastic resin has a melting point or softening point of from about 170 to about 210° C. (degrees centigrade).

The (b) epoxy-based resin is not limited, and may be any epoxy-based resin capable of reacting with and/or curing in the presence of the (c) curing agent and optionally the (a) thermoplastic resin, and optionally with a curing condition such as heat. Typically, the (b) epoxy-based resin comprises or is a high molecular weight solid. Examples of suitable epoxy-based resins include both those derived from the reaction of a low molecular weight liquid epoxy-based resin and a polyol (e.g. bisphenol A), and also rubber adducts of epoxy-based resins. A specific example of a suitable epoxy-based resin is available under the trade name Epon® 1001 F, or Epon® 828, available from Hexion, U.S.A. In certain embodiments, the (b) epoxy-based resin is selected from a Type 4, Type 5, and/or Type 6 epoxy-based resin, as understood in the art.

The (b) epoxy-based resin is present in the coating composition in an amount of from about 15 to about 25, alternatively from about 16 to about 24, alternatively from about 18 to about 22, alternatively from about 19 to about 21, alternatively in an amount of about 20, wt. % based on the total weight of the coating composition.

Typically, the (b) epoxy-based resin has a curing temperature higher than the melting and/or softening point of the (a) thermoplastic resin, such that the (a) thermoplastic resin is soft and/or pliable during curing of the (b) epoxy-based resin. Accordingly, the curing temperature of the (b) epoxy-based resin typically equal to or greater than about 170, alternatively is from about 170 to about 400, alternatively from about 170 to about 350, alternatively from about 170 to about 300, alternatively from about 170 to about 250, alternatively from about 170 to about 225° C.

The (c) curing agent is not limited, and may be any curing agent capable of reacting with and/or curing the (b) epoxy-based resin. Accordingly, the (c) curing agent is typically selected based on the particular (b) epoxy-based resin utilized in the galvanic barrier coating composition, as will be appreciated by those of skill in the art. Examples of suitable curing agents include imidazoles, blocked or modified amines, substituted ureas, anhydrides, dicyandiamides, cyanaguanidines, and the like, and combinations thereof. In some embodiments, the (c) curing agent comprises an imidazole. Examples of suitable imidazoles include 2-methyl imidazole.

The amount of the (c) curing agent in the galvanic barrier coating composition is selected to induce a degree of cross-linking sufficient to inhibit re-flow of the galvanic barrier coating under high temperature conditions. As such, the (c) curing agent is present in the coating composition in an amount sufficient to cure the (b) epoxy-based resin, e.g. in an amount of from about 1 to about 5, alternatively from about 2 to about 3, alternatively from about 2.1 to about 2.9, alternatively from about 2.3 to about 2.7, alternatively from about 2.4 to about 2.6, alternatively in an amount of about 2.5, wt. % based on the total weight of the coating composition.

In addition to the amounts of each particular component described above, it is to be appreciated that the (a) thermoplastic and (b) epoxy-based resins and the (c) curing agent are present in the galvanic barrier coating composition to form a hybrid thermoplastic-thermoset material that, when cured, retains some degree of flexibility and exhibits the strength and rigidity generally expected of a thermoset material. In addition to strength and rigidity, the hybrid thermoplastic-thermoset material of the galvanic barrier coating composition provides the galvanic barrier coating with sufficient cross-linking to prevent reflow of the coating at elevated temperatures, which may occur in some end use scenarios.

The (d) non-compressible, non-marring microsphere particles are not limited, and may be any microsphere particles known in the art. The (d) non-compressible, non-marring microsphere particles are typically selected to provide a non-compressible barrier between a first metal surface coated with the galvanic barrier coating described herein, and an adjacent second metal surface, to prevent contact between the coated first metal surface and the adjacent second metal surface. Preventing contact between such adjacent metal surfaces can inhibit corrosion of at least one of the metal surfaces, which may be exhibited when one of the metal surfaces becomes a sacrificial anode to the other metal surfaces.

It is to be appreciated that the term "non-compressible" may be a descriptive and/or functional term. As such, the (d) non-compressible, non-marring microsphere particles may be completely non-compressible, substantially non-compressible, or partially non-compressible. Suitable microsphere particles typically have a smooth exterior surface to minimize marring of adjacent surface coatings (i.e., are non-marring). As such, it is also to be appreciated that the term "non-marring" may be a descriptive and/ or functional term. Accordingly, the (d) non-compressible, non-marring microsphere particles may be completely non-marring, substantially non-marring, or partially non-marring. Typically, the microsphere particles are selected from particles having a spherical or substantially spherical 3-dimensional shape, in order to minimize rough or sharp particle edges in the galvanic barrier coating. Such microsphere particles may be formed via various techniques, e.g. jet milling, and thus may be of jet-milled grade.

In some embodiments, the (d) non-compressible, non-marring microsphere particles comprise, alternatively consist of, ceramic, steel, and/or glass particles. Exemplary ceramic microspheres include those comprising a ceramic material (e.g. silica-alumina ceramics), such as those ceramic materials having a true-density of from about 2.1 to about 2.5 g/cc, an average particle size distribution of from about 1 to about 200 micrometers, a surface area of from about 2 to about 6 $m^2$/cc, and/or an oil absorption volume of from about 60 g to about 70 g of oil per 100 cc of microspheres. Examples of ceramic microspheres satisfying these characteristics are those under the trade name Zeeosphere™, commercially available from Zeeospheres Ceramics, LLC, of Lockport, La. U.S.A. A specific example of such microsphere particles are those having an average particle diameter of about 30 to 45 micrometers ($95^{th}$ percentile), such as Zeeosphere™ G-600.

Exemplary glass microspheres include SPHERIGLASS® solid glass spheres, available from Potters Industries LLC, U.S.A, such as the SPHERIGLASS® 3000 grade product having a mean particle diameter of 35 micrometers. In some embodiments, the (d) non-compressible, non-marring microsphere particles are quartz-based, alternatively comprise quarts. Such glass and/or quarts microsphere particles are distinguished from ground or crushed glass. As such, the (d) non-compressible, non-marring microsphere particles may be free of, alternatively substantially free of ground and/or crushed glass. Accordingly, in some embodiments, the galvanic barrier coating composition, and the galvanic barrier coating formed therefrom, are free of or substantially free of ground and/or crushed glass.

The (d) non-compressible, non-marring microsphere particles are present in the coating composition in an amount of from about 4 to about 10, alternatively from about 5.5 to about 9, alternatively from about 7 to about 8, alternatively in an amount of about 7.5, wt.% based on the total weight of the coating composition.

The galvanic barrier coating composition may include additional additives, non-limiting examples of which include pigments, flow modifiers, fillers, gloss modifiers, extenders, catalysts, and hardeners. Typically, the galvanic barrier coating composition is free of, alternatively is substantially free of additives for increasing friction of the coating, such as ground or crushed glass, as such additives could damage coatings on adjacent surfaces.

The galvanic barrier coating composition may comprise solvent, or may be a solventless coating composition (e.g. a powder coating composition). If solventless, the galvanic barrier coating composition is free of, alternatively is substantially free of solvent.

In particular embodiments, the galvanic barrier coating composition comprises, alternatively consists essentially of, alternatively consists of: (a) from about 60 to about 80 percent by weight of the thermoplastic resin; (b) from about 15 to about 25 percent by weight of the epoxy-based resin; (c) from about 2.0 to about 3.0 percent by weight of the curing agent suitable for cross-linking the epoxy-based resin; and (d) from about 4 to about 10 percent by weight of non-compressible, non-marring microsphere particles, each based on the total weight of the galvanic barrier coating composition.

Method of Manufacture

The present invention also provides a method of preparing the coated article. The method comprises disposing the galvanic barrier coating composition on the surface of the article, and forming the galvanic barrier coating from the galvanic barrier coating composition to give the coated article.

The galvanic barrier coating composition may be disposed on the surface of the article by any conventional techniques understood in the art, such as dipping, spraying, spin-coating, electrostatic spraying, thermal spraying, flame spraying, fluidized bed coating techniques, and the like. Typically, the galvanic barrier coating composition is applied to the surface of the article in a manner selected based on, at least in part, the galvanic barrier coating composition. For instance, the manner of applying the galvanic barrier coating composition in a solventless form (i.e. a powder coating composition), will typically differ from the manner of applying the galvanic barrier coating composition in a wet form. As such, in various embodiments, the galvanic barrier coating composition is applied to the surface of the article, in either a solventless or wet form, via powder coating, spin coating, brush coating, drop coating, spray coating, dip coating, roll coating, flow coating, slot coating, gravure coating, or the like, or a combination thereof. While the exemplary coating techniques are described herein in reference to coating the article, it is to be appreciated that any number of the articles can be coated concurrently and/or sequentially depending on the coating technique utilized. In some embodiments, the coating technique is suitable for coating multiple articles per minute.

As described above with regard to the coated article, the galvanic barrier coating composition may be disposed on the surface of the article to coat the entire surface thereof, or merely a portion thereof (i.e., a partial coating, e.g. circumferentially and/or lengthwise). As such, the galvanic barrier coating composition may be disposed on a portion, a minority, a majority, or an entirety, of the surface of the article. In some embodiments, the method includes disposing the galvanic barrier coating composition on at least a portion of the surface of the article.

The galvanic barrier coating may be formed from the galvanic barrier coating composition by any method known in the art. Typically, forming the forming the galvanic barrier coating comprises curing the galvanic barrier coating composition. The galvanic barrier coating composition may be cured by any known method, such as via heating, irradiation, drying, and the like, or combinations thereof.

The galvanic barrier coating composition is typically cured via heating the composition to a particular temperature at or above the curing temperature of the (b) epoxy-based resin, as described above, for a period of time sufficient to effect curing (i.e., cross-linking) of the (b) epoxy-based resin and the (c) curing agent present in the galvanic barrier coating composition. The particular temperature at which the galvanic barrier coating composition is heated may be selected based on the cure temperature for the (b) epoxy-based resin and/or the (c) curing agent present in the galvanic barrier coating composition, and/or the melting and/or softening point temperature of the (a) thermoplastic resin. For example, the particular temperature is typically greater than the melting and/or softening point of the thermoplastic resin.

In some embodiments, the article may be heated to a predetermined temperature sufficient to cure the (b) epoxy-based resin when the galvanic barrier coating composition is disposed on the surface of the article, without additional heating. In such embodiments, disposing the galvanic barrier coating composition on the surface of the article and forming the galvanic barrier coating from the galvanic barrier coating composition happen concurrently, or substantially concurrently. In particular embodiments, the article is heated to a temperature of at least 180° C. prior to applying the galvanic barrier coating composition on the surface of the article. Alternatively or in addition, the article may be heated after application of the galvanic barrier coating composition to cure the (b) epoxy-based resin.

In certain embodiments, the method further comprises cooling the coated article after forming the galvanic barrier coating. In such embodiments, the coated article may be cooled by application of a cooling liquid, which may be cooled or unheated, or allowed to equilibrate to room temperature. As curing the (b) epoxy-based resin and (c) curing agent produces a thermoset, the application of the cooling liquid typically sets the thermoset, and thus the galvanic barrier coating.

In some embodiments, applying the galvanic barrier coating composition to the surface of the article includes utilizing a conveyor system. The conveyor system typically comprises belts, which are spaced sufficiently apart to catch a portion of the article as the article is supplied to the conveyor system. The belts are typically configured to travel at different speeds to induce rotation of the article when caught between at least two of the belts. The conveyor system may convey the article through a heated zone to heat the article, or a portion thereof, to a predetermined curing temperature, after which the article is conveyed to a spray zone. The galvanic barrier coating composition is sprayed onto the heated article, or heated portion of the article, as a solventless powder spray to coat a desired portion of the article. The rotation of the article by the belts of such a conveyor system facilitates uniform heating and coating of the article. The article can be heated in the heated zone to a temperature sufficient to substantially cure the galvanic barrier coating composition, thereby forming the galvanic barrier coating, as it is sprayed onto the article without additional heating. The thus coated article may be sprayed with a cooling liquid to cool the coated article and, in some cases, set the coating.

Alternatively, the conveyor system may convey the article through the spray zone prior to conveying the article through the heated zone.

The galvanic barrier coating of the present invention is particularly suited for use on bolt-and-nut assemblies and the like, particularly those comprising threaded fasteners. As such, in some embodiments, the galvanic barrier coating composition is used to coat a wheel hub bolt comprising a steel head, shank, and/or threaded surface, such as an M16 bolt (i.e., the article), to form a coated wheel hub bolt.

Method of Use

The present invention further provides a method of adjoining adjacent elements with the coated article. The elements are not limited, and may be any joinable elements known in the art. Furthermore, any number of elements, e.g. three or more, may be joined in accordance with the present invention. Each of the elements may be the same as or different than one another. As such, each element may be independently selected, typically based on the intended use of the adjoined elements. In view of the above, it is to be understood that reference to "the element" herein may refer to any one or more of the elements being adjoined.

The elements may be independently formed from any conventional material(s), such as metal, wood, plastic, ceramic, glass, and the like, or combinations thereof. Typically, the elements comprise metal. The metal is not limited, and may be any metal. Typically, the metal is selected to provide the element with strength, rigidity, and/or durability. Specific examples of suitable metals include iron, brass, bronze, titanium, aluminum, magnesium, tungsten, molybdenum, manganese, chromium, nickel, and the like, or a combination or alloy thereof. In some embodiments, the metal is an alloy. Examples of suitable alloys include steels, such as carbon steels, alloy steels, stainless steels, and the like, and combinations thereof. Generally, each element comprises a metal different (e.g. of a different composition and/or electrode potential) than the metal of the coated article such that, in the absence of the galvanic barrier coating, one of the metals would corrode when in contact with the other. Each element may further comprise a conventional plating and/or coating, such as those coatings described herein. Each of the elements may be formed from one type of metal and further comprise the conventional plating and/or coating comprising another type of metal. Alternatively, each of the elements may be a "virgin" or "bright" article (i.e., it may lack plating/coating).

Each element may be of any particular shape, size, or design. Typically, each element is shaped to be joined to the coated article, and optionally to another element. In some embodiments, each element defines an aperture.

The method of using the coated article comprises disposing the coated article adjacent and/or through the adjacent elements. The coated article may be disposed adjacent and/or through the adjacent elements using any technique known in the art, which may be performed manually, mechanically, pneumatically, hydraulically, gravitationally, and the like, or combinations thereof.

In some embodiments, the coated article is a coated fastener and utilized to adjoin the adjacent elements. In such embodiments, the method comprises adjoining the adjacent elements with the coated fastener by disposing the coated fastener adjacent and/or through the adjacent elements. In particular embodiments, the method comprises disposing the coated fastener in the apertures defined by the elements. In other embodiments, the coated fastener may form the aperture in situ while being disposed through the substrate (e.g. in the case of self-tapping screws).

As introduced above, the galvanic barrier coating is particularly suited for use on bolt-and-nut assemblies and the like, particularly those comprising threaded fasteners. As such, as also described above, the galvanic barrier coating composition is used to form the coated wheel hub bolt in certain embodiments. Likewise, in some embodiments, the coated article of the method is further defined as the coated wheel hub bolt. The coated wheel hub bolt comprises a head, a threaded surface, and a shank adjacent and separating the head and the threaded surface, wherein at least one of the head, shank, and threaded surface comprises steel. The coated wheel hub bolt further comprises the galvanic barrier coating disposed on at least a portion of the shank between the head and the threaded surface, and may optionally coat, or partially coat, the threaded surface. In such embodiments, the method comprises disposing the coated wheel hub bolt through an aluminum surface of a wheel hub, such the galvanic barrier coating of the coated wheel hub bolt to provides a barrier between the steel of the wheel hub bolt and the aluminum surface of the wheel hub.

In such embodiments, the galvanic barrier coating may inhibit contact between the steel head, shank, and/or threaded surface of the wheel hub bolt and the aluminum surface of the wheel hub, and thus inhibit corrosion of the aluminum surface of the wheel hub adjacent the coated wheel hub bolt. The combination of a steel-containing bolt and an aluminum-containing wheel hub can often result in corrosion of the aluminum of the wheel hub as the aluminum becomes a sacrificial anode to the steel of the bolt. The galvanic barrier coating of the present invention can inhibit the aluminum of the wheel hub from becoming a sacrificial anode by inhibiting direct contact between the steel of the bolt and the aluminum of the wheel hub, thus inhibiting corrosion of the aluminum-containing wheel hub.

Additional types of fasteners, additives, secondary components (e.g. platings/coatings), methods of manufacture (e.g. coating techniques), and/or applications (e.g. element fastening) suitable for use with the present invention, are described in U.S. Pat. Nos. 5,426,130; 5,651,824; 5,656,325; 5,672,376; 5,679,160; 5,928,711; 5,964,551; 6,027,568; 6,270,838; 6,322,628; 6,474,919; 6,817,816; 7,404,483; 7,521,402; 7,771,148; 7,772,316; 7,878,744; 8,865,794; and 8,865,812; U.S. Patent Application Publication Nos. 2014/0199135, 2015/0014126 and 2015/0056394; Canadian Patent No. CA2632482; and International (PCT) Publication Nos. WO1999066219, WO2008073262, WO2008094535, WO20080945372, WO2008153866, and WO2008153868, the disclosures of which are hereby incorporated by reference in their entirety.

INDUSTRIAL APPLICABILITY

While the present invention is not limited to a particular end application, use or industry, industrial and automotive equipment manufacturers often rely on coated articles to prevent critical parts from failing. The galvanic barrier coating composition has excellent physical properties, including adhesion to and uniform coverage of a variety of substrates and high temperature resistance. The galvanic barrier coating composition provides a barrier between two metal surfaces that inhibits the metal surfaces from coming into contact with one another. The galvanic barrier coating composition inhibits aluminum corrosion which results from the use of steel fasteners for joining an aluminum part.

The following example is intended to illustrate the present invention and is not to be viewed in any way as limiting to the scope of the present invention.

EXAMPLE

Example 1

A solventless powder composition is prepared and utilized to form a galvanic barrier coating composition. The components of the coating composition, along with the percent weight of each component in the composition, are set forth in Table 1 below.

TABLE 1

| Component | Wt. % |
| --- | --- |
| (a) Thermoplastic resin | 70-80 |
| (b) Epoxy-based resin | 10-20 |
| (d) Microsphere particles | 5-10 |
| (c) Curing agent | >0-5 |

The (a) thermoplastic resin is a nylon powder that includes a small amount of an epoxy adhesion promoter. In this Example 1, the (a) thermoplastic resin is Nylon 11, which includes approximately 5 wt. % of an epoxy adhesion promoter and has an average particle diameter of 160 micrometers.

The (b) epoxy-based resin is a low molecular weight solid epoxy-based resin derived from the reaction between a liquid epoxy-based resin and bisphenol A and having a weight per epoxide of 525-550 grams per equivalent.

The (d) microsphere particles are ceramic microspheres having a particle size in the $95^{th}$ percentile of about 30-45 micrometers.

The (c) curing agent is a 2-methyl imidazole.

The galvanic barrier coating composition is spray coated onto an article that has been heated to a predetermined curing temperature to substantially cure the galvanic barrier coating composition as it is applied to the article, which is 180° C., to form the galvanic barrier coating and thereby give a coated article. The coated article is then sprayed with a cooling liquid to facilitate cooling the coated article and setting the galvanic barrier coating.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A coated article, comprising:
   an article comprising a surface; and
   a galvanic barrier coating disposed on the surface of the article, the galvanic barrier coating formed from a galvanic barrier coating composition comprising:
   (a) from about 60 to about 80 percent by weight of a thermoplastic resin;
   (b) from about 15 to about 25 percent by weight of an epoxy-based resin;
   (c) from 2.0 to 3.0 percent by weight of a curing agent suitable for cross-linking the epoxy-based resin; and
   (d) from about 4 to about 10 percent by weight of non-compressible, non-marring microsphere particles, each based on the total weight of the galvanic barrier coating composition.

2. The coated article of claim 1, wherein the (a) thermoplastic resin (i) has a melting point within a range of about 170 to about 210° C.; (ii) comprises a polyester resin, a thermoplastic urethane, a polyolefin, a polyamide resin, or combinations thereof; or (iii) both (i) and (ii).

3. The coated article of claim 2, wherein the (a) thermoplastic resin comprises the polyamide resin, and the polyamide resin is selected from the group of Nylon 6, Nylon 6/10, Nylon 12/12, Nylon 11, Nylon 12, Nylon 6/6, Nylon 6/12, and combinations thereof.

4. The coated article of claim 1, wherein the (a) thermoplastic resin is a powder having particles with an average diameter of about 160 micrometers.

5. The coated article of claim 1, wherein the (b) epoxy-based resin comprises the reaction product of an epoxy resin and bisphenol-A.

6. The coated article of claim 1, wherein the (c) curing agent is present at about 2.5 percent by weight.

7. The coated article of claim 1, wherein the (c) curing agent is selected from blocked or modified amines, substituted urea, anhydrides, dicyandiamide, imidazoles, and combinations thereof.

8. The coated article of claim 1, wherein the (d) non-compressible, non-marring microsphere particles are selected from the group consisting of ceramic microspheres, glass microspheres, and steel microspheres.

9. The coated article of claim 8, wherein the (d) non-compressible, non-marring microsphere particles are the ceramic microspheres, wherein the ceramic microspheres have a particle size in the $95^{th}$ percentile of about 35 micrometers.

10. The coated article of claim 1, wherein the galvanic barrier coating composition is free of ground or crushed glass.

11. The coated article of claim 1, wherein the galvanic barrier coating composition is solventless.

12. A method of preparing the coated article of claim 1, said method comprising:
   disposing the galvanic barrier coating composition on the surface of the article; and
   forming the galvanic barrier coating from the galvanic barrier coating composition to give the coated article.

13. The method of claim 12, wherein the galvanic barrier coating composition is a powder coating.

14. The method of claim 12, wherein disposing the galvanic barrier coating composition comprises at least one of spraying, spin-coating, electrostatic spraying, thermal spraying, flame spraying, and fluidized bed coating techniques.

15. The coated article of claim 1, wherein the article is a fastener and the coated article is further defined as a coated fastener.

16. A method of adjoining adjacent elements with a coated article, said method comprising:
   disposing the coated article adjacent and/or through the adjacent elements;
   wherein the coated article is the coated article of claim 1.

17. A coated article, comprising:
an article comprising a surface; and
a galvanic barrier coating disposed on the surface of the article, the galvanic barrier coating formed from a galvanic barrier coating composition comprising:
   (a) from about 60 to about 80 percent by weight of a thermoplastic resin;
   (b) from about 15 to about 25 percent by weight of an epoxy-based resin;
   (c) from about 2.0 to about 3.0 percent by weight of a curing agent suitable for cross-linking the epoxy-based resin; and
   (d) from about 4 to about 10 percent by weight of non-compressible, non-marring microsphere particles, each based on the total weight of the galvanic barrier coating composition;
wherein the galvanic barrier coating is free of crushed or ground glass.

* * * * *